Dec. 30, 1969    H. S. MAXWELL    3,486,393
SCREW POSITIONING DRIVE FOR ROLLING MILLS
Filed Sept. 4. 1968    3 Sheets-Sheet 1

INVENTOR.
HUGH S. MAXWELL
BY
John B. Sponsler

Dec. 30, 1969 H. S. MAXWELL 3,486,393
SCREW POSITIONING DRIVE FOR ROLLING MILLS
Filed Sept. 4, 1968 3 Sheets-Sheet 2

INVENTOR.
HUGH S. MAXWELL

Dec. 30, 1969     H. S. MAXWELL     3,486,393
SCREW POSITIONING DRIVE FOR ROLLING MILLS
Filed Sept. 4, 1968        3 Sheets-Sheet 3

INVENTOR.
HUGH S. MAXWELL

United States Patent Office 3,486,393
Patented Dec. 30, 1969

3,486,393
SCREW POSITIONING DRIVE FOR ROLLING MILLS
Hugh S. Maxwell, Schenectady, N.Y., assignor to General Electric Company, a corporation of New York
Filed Sept. 4, 1968, Ser. No. 757,274
Int. Cl. B21b *31/24;* F16h *1/18, 55/18*
U.S. Cl. 74—424.8                 12 Claims

ABSTRACT OF THE DISCLOSURE

A drive for a roll adjusting screw extending through a threaded nut anchored in a rolling mill stand. The drive includes a gearmotor secured to the upper end of the screw. The gearmotor housing has outriggers which ride within vertical guides on the mill to prevent rotation of the gearmotor housing while permitting the gearmotor to rise and fall with the screw. The tight fit between the gearmotor and the screw reduces lash and thus permits accurate position sensing by means of a sensor that is mounted on the gearmotor housing and is coupled to the screw by a timing belt.

BACKGROUND OF THE INVENTION

In a metal rolling mill, the gage or thickness of a metal member is reduced by passing the member between horizontal, opposed rolls. Normally, to adjust the amount of reduction or draft taken during a particular rolling pass, the relative position of the opposed rolls is changed by changing the position of the upper roll through the use of opposing forces. A hydraulic balance system provides an upwardly directed force on the supports at the ends of the upper roll while a pair of vertical threaded screws bear downwardly on these supports. When the screws are turned in one direction in threaded nuts anchored in the mill stand housing, the upper roll moves toward the lower roll against the upward force exerted by the hydraulic balance system. Conversely, when the screws are turned in the opposite direction, the reduction in downward force permits the hydraulic balance system to move the upper roll away from the lower roll.

In a conventional mill stand, each screw is turned in the threaded nut by a D.C. motor having a horizontal shaft connected to the upper end of the screw through a speed reducing power train consisting of a combination of pinion gearing and worm gearing. Each D.C. motor, often capable of producing 150 H.P. at approximately 1,000 r.p.m., is connected directly to the pinion gearing which, in turn, drives a horizontal worm. The horizontal worm meshes with an annular worm wheel slideably mounted on the upper end of the screw. The worm wheel, which rotates in a fixed horizontal plane, is internally splined to mesh with the externally splined upper end of this screw. When the D.C. motor is energized, the worm wheel is rotated by the worm to turn the screw in its immovable nut. As the screw rises or falls relative to the nut, the upper end of the screw moves relative to the worm wheel. The speed reduction between the motor shaft and the worm wheel is typically on the order of 400 to 1 with the worm gearing normally contributing a reduction of 30 to 1.

To assure that the screws at opposite ends of a roll move in synchronism, an electrically-actuated clutch is interposed between the aligned horizontal shafts of each pair of motors. The clutch is engaged by an operator when the screws are to move in synchronism and is disengaged when it is desired to move one end of the roll to a different position relative to the other end to bring the axes of the upper and lower rolls into parallelism.

With the advent of automatic gage control systems, certain shortcomings of the conventional screw positioning drive have become increasingly significant. One of these shortcomings is the amount of play or lash in the power train. Because the screw must slide relative to the worm wheel, clearances must be provided between the splines of the two parts. These clearances create a good deal of lash in the power train. In addition, designed clearances between the worm wheel and the worm to accommodate thermal expansion add to the total lash in the system. Additional lash is created by the unbalanced thrust of the worm against the periphery of the worm wheel. Although lash caused by each of these factors may appear to be insignificant when viewed from the screw end of the power train, the reflection of lash back through the 400 to 1 speed reducing power train produces lash which may be equal to as much as 120 degrees rotation of the D.C. motor. That is, when the direction in which the screw is turned is reversed, the D.C. motor rotor has to rotate through an angle of 120 degrees before the slack in the power train is overcome and the screw actually begins to turn in the new direction. If the draft to be taken in the metal being rolled is on the order of a few mils, the lash may approach the amount of motor rotation nominally required for the proper mill adjustment. To accurately position a roll where the screw positioning drive has a power train with a great amount of lash, complex position regulating systems must thus be utilized.

A second shortcoming of a conventional screw positioning drive is due, in part, to the fact that the upper end of the screw is often reduced in diameter to accommodate the surrounding annular worm wheel with its horizontal worm. When the D.C. motors are energized to change the position of a screw, the torque exerted on the upper end of the screw may result in a momentary twisting of the screw as the screw metal yields. This twist or deflection naturally increases the problems of position regulation.

Another shortcoming of a conventional screw positioning drive is its low mechanical efficiency. While the efficiency of the pinion gearing in the conventional power train often exceeds 90 percent, the efficiency of the worm gearing is often below 40 percent at the rated horsepower of the D.C. motors. Efficiency is reduced further by sliding friction between the internal splines of the worm wheel and the external splines of the screw. To compensate for the low efficiency in the power train, the motors and the electrically-actuated clutch must be large enough to supply frictional losses in the power train while transmitting sufficient power through the power train to move the screws against the force of the hydraulic balance system. Automatic gage control systems often require that the roll opening be changed as much as 10 mils within one second. With the oversized motors and clutches used in conventional drives, the mechanical inertia created by the mass of the motor rotors, the clutch, and the motor-to-clutch shafting is quite high. Because approximately 80 percent of the available motor torque may be required to accelerate the various components in the power train rather than to do useful work, rapid and accurate changes in the roll opening are difficult with conventional drive systems.

SUMMARY OF THE INVENTION

To overcome the problems and shortcomings of the conventional drive described above, the present invention has been developed. The invention is a screw positioning drive which includes a drive means that is supported on the screw and that has conventional rotating and stationary elements. The rotating elements of the drive means are coupled rigidly to one end of the screw. An outrigger means connected to the stationary elements of the drive means cooperates with guide means on a mill housing to prevent rotational movement of the stationary elements while permitting linear movement of the entire drive means along a path parallel to the axis of the screw.

DESCRIPTION OF THE DRAWINGS

While the specification concludes with claims particularly pointing out and distinctly claiming that which is regarded as the present invention, the details of a preferred embodiment of the invention may be more readily ascertained from the following detailed description when read in conjunction with the accompanying drawings in which:

DETAILED DESCRIPTION

Figure 1:
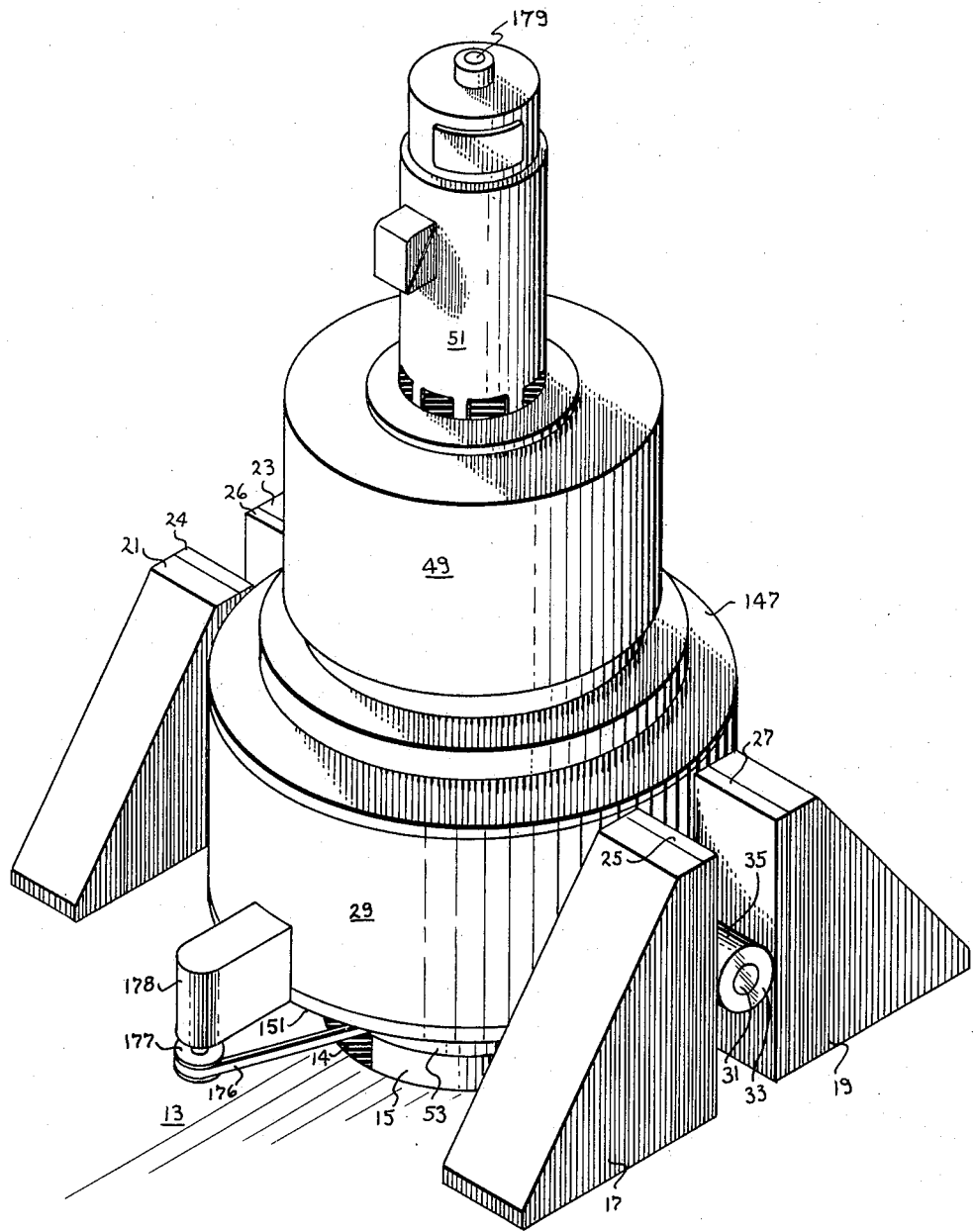
FIG. 1 is a perspective view of a screw positioning drive constructed in accordance with the present invention.

Referring now to FIG. 1, the top surface 13 of a conventional mill housing has an opening 14 for the upper end of a mill screw 15. Mill screw 15 is threaded through and supported by an immovable nut (not shown) anchored within the mill housing. The mill screw 15 supports the screw positioning drive means which includes a drive motor 51, preferably an electric servomotor, and speed reducing gearing contained in the housings 29 and 49. The mill screw 15 is rigidly coupled to the speed reducing gearing at a cylindrical gearing hub 53, the internal configuration of which is complementary to the external configuration of the upper end of the mill screw 15. The housing 29 containing the final stages of the speed reducing gearing has upper and lower flanges 147 and 151, respectively.

Since the drive motor 51 and the speed reducing gearing contained in housings 29 and 49 are supported entirely on the upper end of screw 15, the torque reaction accompanying the energization of drive motor 51 would tend to rotate the entire drive if there were no restraint placed on movement of the supposedly stationary elements, such as the stator of drive motor 51. The necessary restraint it provided by outrigger means attached to the stationary elements of the drive. The outrigger means (described below) cooperate with guides including supports 17, 19 and 21, 23 secured to the top surface 13 on opposite sides of the opening 14. Wear resistant faceplates 25 and 27 on supports 17 and 19 and faceplates 24 and 26 on supports 21 and 23 define openings parallel to the axis of the mill screw 15. The outrigger means include a stub shaft 31 attached to housing 29. A roller bearing 33 on stub shaft 31 has an outer bearing race 35 in contact with one of the faceplates 25 or 27. Diametrically across from the stub shaft 31 and bearing 33, a similar outrigger means (not shown) extends into the opening defined by faceplates 24 and 26.

In operation the drive motor 51 drives the output hub 53 through a series of planetary gears (described later) thereby rotating screw 15 in its immovable nut to increase or decrease the force applied to the ends of the mill roll. Depending on the direction of rotation of drive motor 51, torque reaction will force the outrigger means into contact with faceplates 25 and 26 or faceplates 24 and 27. As the screw positioning drive rises or falls with the screw, race 35 and the diametrically opposite race (not shown) roll along whichever of the faceplates they are in contact with.

The position of the mill screw 15 is monitored by a position sensor 178 attached to the lower portion of housing 29. Sensor 178 is mechanically coupled directly to the upper end of mill screw 15 by means of a timing belt 176 which encircles the screw 15 and a pulley 177 at the bottom of sensor 178. It may be desirable to supplement the position sensor 178 with velocity and acceleration sensors. These could be driven in tandem with position sensor 178 from pulley 177 or, in the alternative, directly from screw 15 by means of individual timing belts. A simpler arrangement would be to couple one or more sensors to a shaft extension 179 at the upper end of drive motor 51. However, this arrangement is not a preferred one since lash in the drive assembly could introduce errors in the position sensing.

Figure 2:
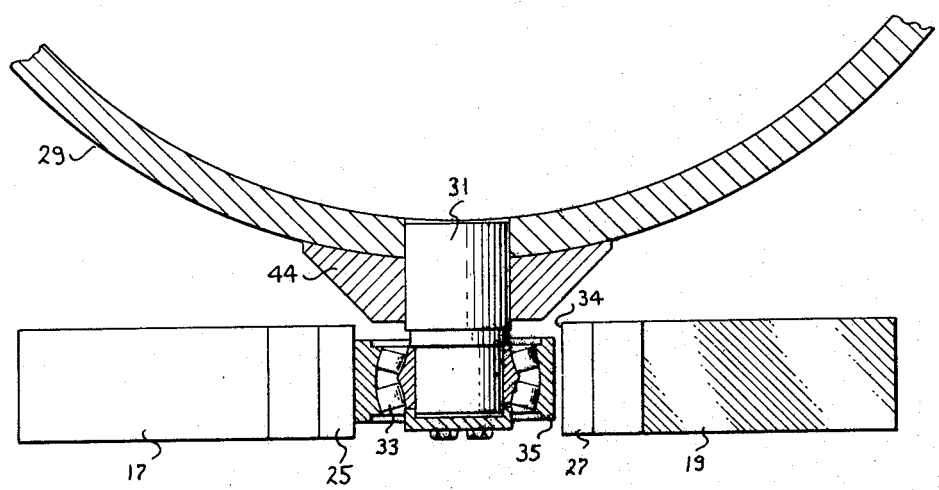
FIG. 2 is a cross-sectional top view of a preferred embodiment of a mechanism for preventing rotational movement of a gear means while allowing it to move linearly.

FIG. 2 is a cross-sectional detailed view of a preferred embodiment of the outrigger means. The stub shaft 31 is attached to the housing 29 and is secured by a reinforcing plate 44. Bearing 33 on stub shaft 31 is shown with its outer race 35 in contact with faceplate 25. During counterclockwise motion (viewed from above) of the screw 15 (not shown) the housing 29 tends to rotate in a clockwise direction causing bearing 33 to contact the faceplate 25. If the screw 15 is rotated in the clockwise direction, however, the housing 29 tends to rotate in the counterclockwise direction until bearing 33 contacts the faceplate 27. As the drive means moves up and down with the motion of the screw 15, the bearing 33 rolls along faceplate 25 or 27 depending on the direction of rotation of the screw 15. A small clearance 34, on the order of a few thousandths of an inch, is provided between race 35 and faceplates 25 and 27 to assure that the race 35 does not contact both faceplates at the same time.

Figure 3:
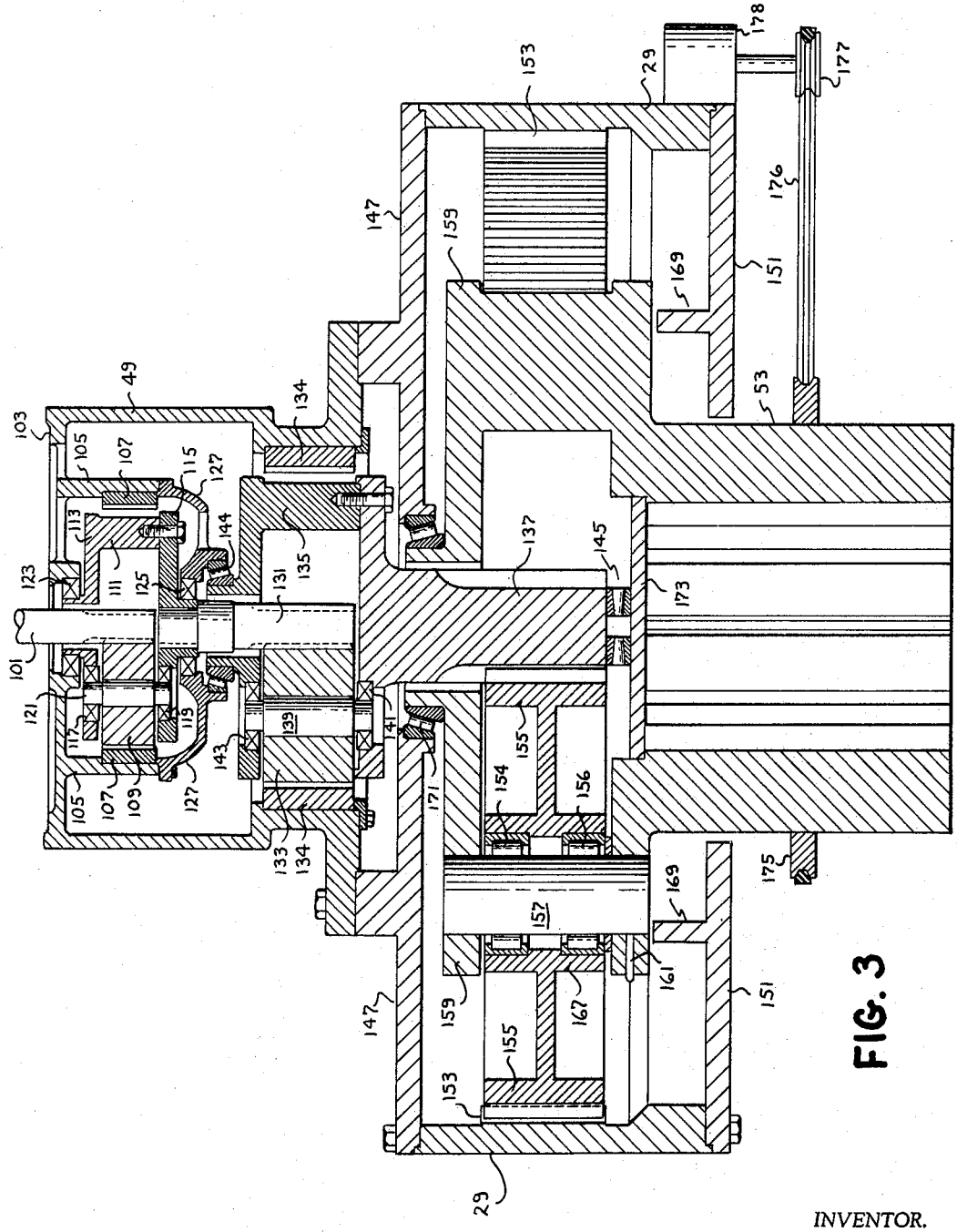
FIG. 3 is a cross-sectional view of a preferred embodiment of a gear arrangement for use in the screw positioning drive.

Referring now to FIG. 3, a splined input shaft 101 from the drive motor 51, the stator (not shown) of which is secured to an upper flange 103 of housing 49, protrudes downwardly into the housing. A concentric circular rib 105 on housing 49 supports a first stage ring gear 107. Three first stage planet gears, of which one gear 109 is shown, mesh with the splined shaft 101 which performs the function of a sun gear in the first stage planetary gear system. A yoke 111, having an upper portion 113 and a lower portion 115, rotatably supports each of the planet gears 109 in bearings 117 and 119 on shaft 121. Yoke 111 is rotatably supported by bearing 123 which is fitted into the upper flange 103 and a first stage bearing support 127, respectively, which is mounted to the bottom of the circular rib 105. Splined shaft 131 which forms the sun gear of the second stage planetary gear system, is rigidly attached to the lower portion 115 of yoke 111. Sun gear 131 meshes with three planet gears, of which one gear 133 is shown, which also mesh with ring gear 134. Each of these planet gears 133 is rotatably supported by a second stage yoke 135 through a shaft 139 which is mounted in roller bearings 141 and 143. Yoke 135 has attached thereto a flanged shaft 137 having splines formed in its surface thereby forming the sun gear of the third stage planetary gear system. A roller bearing 144 mounted in the first stage bearing support 127 provides a rotating support for the upper end of second stage yoke 135. A thrust bearing 145 provides a compression bearing for the third stage sun gear.

Housing 29, with upper flange 147 and lower flange 151, supports a third stage ring gear 153. Three planet gears, of which one gear 155 is shown, mesh with the third stage ring gear and are each supported by a shaft 157 which is rigidly attached to a yoke 159 and the upper portion of hub 53, having been secured thereto by a pin 161. Roller bearings 154 and 156 are rigidly attached to hub 167 of planet gear 155 allowing this gear to rotate freely on shaft 157.

Internally splined hub 53, extending from an opening in flange 151, is force fitted to a matching splined neck at the upper end of the screw 15 (not shown). This forced fit made possible by the fact that the drive means rises and falls with the screw, eliminates any lash between the drive means and the screw.

The planetary gears are oil lubricated. Oil flows by gravity into an annular sump formed by flanges 169 and 151, and housing 29, from which the oil is returned to the first stage by an external, separately driven pump, not shown.

Roller bearing 171 fitted into the upper flange 147 of shell 29 supports the upper end of the third stage yoke. A hard metal plate 173 supports the second stage sun gear 137 through bearing 145. A timing belt 176 encircles a pulley 175 mounted on the hub 53 and the pulley 177 on position sensor 178.

The reductioins in each of the stages may be any ratio desired. For the gearing shown in FIG. 3, input/output ratio for the first stage is 9.2 to 1, the ratio of the second stages is 9.2 to 1 and the ratio of the third stage is 11.5 to 1 which produces an overall input/output ratio of 973.36 to 1. In other words, a motor speed of 973.36 r.p.m. would produce a screw speed of 1 r.p.m and, ignoring losses, a torque amplification of 973.36:1.

When a screw positioning drive is constructed in accordance with the present invention, the lash in the power train can be reduced to approximately 18 degrees of drive motor rotation in contrast to the 120 degree lash sometimes existing in conventional drive systems. Moreover, the elimination of worm gearing and the forced fit between the screw and the speed reduction gearing may result in a mechanical efficiency of at least 80 percent rather than 40 percent as was common in the conventional screw positioning drives. The increased efficiency permits the use of smaller motors which in turn reduces the mechanical inertia of the drive. Furthermore, the decreased lash and the mounting of a position sensor on the drive, from which it may be directly coupled to the screw, make it possible to eliminate the clutch conventionally used to assure synchronous screw adjustment. The elimination of the clutch naturally reduces the mechanical inertia still further to increase the possible rate of screw adjustment.

While there has been described what is believed to be a preferred embodiment of the present invention, it should be understood that variations and modfications may occur to those skilled in the art. For instance, offset gearing may be used in place of planetary gearing. Similarly, a hydraulic motor may be substituted for the preferred electric servomotor.

What is claimed is:

1. For use with a roll adjusting screw rotatable within a threaded nut anchored in a mill stand housing, a screw positioning drive including:
    (a) a drive means with rotating and stationary elements;
    (b) means for rigidly coupling the rotating element of said drive means to one end of the screw;
    (c) guide means on the mill stand housing defining an opening parallel to the axis of the screw; and
    (d) outrigger means attached to the stationary element of said drive means and extending through the opening formed by said guide means for preventing rotational movement of the stationary element while permitting linear movement of said drive means and said coupling means along a path parallel to the axis of the screw upon energization of said drive means.

2. A screw positioning drive as recited in claim 1 further including:
    (a) a position sensor secured to the stationary element of said drive means; and
    (b) means for connecting said position sensor to said coupling means.

3. A screw positioning drive as recited in claim 2 wherein said connecting means comprises:
    (a) a first pulley secured to said coupling means;
    (b) a second pulley at the input to the position sensor; and
    (c) a timing belt encircling said first and said second pulleys.

4. For use with a vertical screw rotatable within a threaded nut anchored in a mill stand housing, a screw positioning drive including:
    (a) a gearmotor supported on the screw comprising rotating elements mechanically connected to the upper end of the screw and stationary elements;
    (b) guides supported on the mill stand housing on opposite sides of said gearmotor, said guides defining vertical openings therebetween; and
    (c) outrigger shafts attached to and extending outwardly from opposite sides of the stationary elements into the vertical openings to prevent rotation of the stationary elements while permitting vertical movement of said gearmotor.

5. A screw positioning drive as recited in claim 4 wherein the rotating elements of said gearmotor include an output shaft having an internal configuration complementary to the external configuration of the upper end of the screw.

6. A screw positioning drive as recited in claim 5 wherein said outrigger shafts carry rollers to provide rolling contact with the guides during vertiral movement of said gearmotor.

7. A screw positioning drive as recited in claim 5 wherein said gearmotor includes planetary gearing for exerting radially balanced rotational forces on the upper end of the screw.

8. A screw positioning drive as recited in claim 4 wherein said outrigger shafts carry rollers to provide rolling contact with the guides during vertical movement of said gearmotor.

9. A screw positioning drive as recited in claim 8 wherein said gearmotor includes planetary gearing for exerting radially balanced rotational forces on the upper end of the screw.

10. A screw positioning drive as recited in claim 4 wherein said gearmotor includes planetary gearing for exerting radially balanced rotational forces on the upper end of the screw.

11. A screw positioning drive as recited in claim 4 further including:
    (a) a position sensor secured to the stationary elements of said gearmotor; and
    (b) means for connecting said position sensor to said coupling means.

12. A screw positioning drive as recited in claim 11 wherein said coupling means comprises:
    (a) a first pulley secured to the rotaing elements of said gearmotor;
    (b) a second pulley at the input to the position sensor; and
    (c) a timing belt encircling said first and said second pulleys.

References Cited

UNITED STATES PATENTS 2,820,187  1/1958  Parsons et al.
3,222,954  12/1965  Wuertz _____ 74—801

LEONARD H. GERIN, Primary Examiner

U.S. Cl. X.R.
72—248; 74—409